US008775561B2

(12) United States Patent
Szeto et al.

(10) Patent No.: US 8,775,561 B2
(45) Date of Patent: Jul. 8, 2014

(54) EXPANDING A SOCIAL NETWORK BY THE ACTION OF A SINGLE USER

(75) Inventors: Christopher T. Szeto, Sunnyvale, CA (US); Michael Holzer, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1222 days.

(21) Appl. No.: 11/696,058

(22) Filed: Apr. 3, 2007

(65) Prior Publication Data

US 2008/0250322 A1    Oct. 9, 2008

(51) Int. Cl.
*G06F 15/16* (2006.01)
*H04L 12/58* (2006.01)
*G06Q 10/10* (2012.01)

(52) U.S. Cl.
CPC ............... *G06Q 10/10* (2013.01); *H04L 51/32* (2013.01); *H04L 12/581* (2013.01); *H04L 12/588* (2013.01); *H04L 51/04* (2013.01)
USPC .......................................... 709/218; 709/206

(58) Field of Classification Search
USPC ........... 709/200, 203–206, 217–219; 705/319
See application file for complete search history.

(56) References Cited

U.S. PATENT DOCUMENTS

| | | | | |
|---|---|---|---|---|
| 7,685,236 B1 * | 3/2010 | Harik et al. | ............ | 709/205 |
| 7,716,140 B1 * | 5/2010 | Nielsen et al. | ............ | 705/319 |
| 7,739,139 B2 * | 6/2010 | Robertson et al. | ............ | 705/9 |
| 7,930,730 B2 * | 4/2011 | Brewer et al. | ............ | 726/3 |
| 8,019,875 B1 * | 9/2011 | Nielsen | ............ | 709/227 |
| 8,056,011 B2 * | 11/2011 | Fitzpatrick et al. | ............ | 715/758 |
| 2002/0107859 A1 | 8/2002 | Tsuyuki | | |
| 2005/0159970 A1 * | 7/2005 | Buyukkokten et al. | ............ | 705/1 |
| 2006/0042483 A1 | 3/2006 | Work et al. | | |
| 2006/0085373 A1 * | 4/2006 | Dhillion et al. | ............ | 707/1 |
| 2006/0218225 A1 * | 9/2006 | Hee Voon et al. | ............ | 709/201 |
| 2007/0043823 A1 * | 2/2007 | George et al. | ............ | 709/207 |

(Continued)

FOREIGN PATENT DOCUMENTS

| | | |
|---|---|---|
| TW | 200421829 | 10/2004 |
| WO | WO 2006/098588 A1 | 9/2006 |

OTHER PUBLICATIONS

"Social network service" downloaded Mar. 9, 2007 from the Internet <http://en.wikipedia.org/wiki/Social_network_service>, 3 pages.

(Continued)

*Primary Examiner* — Joshua Joo
(74) *Attorney, Agent, or Firm* — Hickman Palermo Truong Becker Bingham Wong LLP (57) ABSTRACT

Techniques for creating a social network are provided. Private relationships that are established (e.g., in the context of instant messaging) may become public by the action of a single user. Each user determines whether they want to be "social" to (or discoverable by) friends of the user's friends. For example, user A is a friend of (i.e., has established a relationship with) user B and user B is a friend of user C, but user A and user C are not friends of each other (i.e., user A and user C have not established a relationship with each other). If user C unilaterally takes an action, then user A is able to see that user C is a friend of user B. User A may then take further actions to attempt to establish a relationship with user C or otherwise contact user C.

30 Claims, 5 Drawing Sheets

(56) References Cited

U.S. PATENT DOCUMENTS

2007/0067392 A1* 3/2007 Torres et al. ............... 709/206
2008/0183694 A1* 7/2008 Cane et al. ..................... 707/5
2012/0272332 A1* 10/2012 Zuckerberg et al. .......... 726/27
2012/0278859 A1* 11/2012 Bansal et al. ................... 726/3

OTHER PUBLICATIONS

"Notification of Transmittal of the International Search Report and the Written Opinion of the International Searching Authority, or the Declaration" received in corresponding International application No. PCT/US2008/056157 dated Jun. 30, 2008 (10 pages).

"Method for Managing Social Network Information and System Therefor" JP2007026419 published Feb. 1, 2007 (26 pages).

Taiwanese Office Action received in Application No. 97112044 dated Nov. 3, 2011 (2 pages).

Current Claims of Taiwanese Application No. 97112044 dated Nov. 2011 (5 pages).

* cited by examiner

EXPANDING A SOCIAL NETWORK BY THE ACTION OF A SINGLE USER

FIELD OF THE INVENTION

The present invention relates generally to social networking and, more particularly, to expanding a social network by the action of a single user.

BACKGROUND

Online social networks are becoming increasingly particular. An online social network (hereinafter "social networks") is network in which users can browse profiles of their established "friends", friends of those friends, and so forth. However, social networks such as MySpace, Yahoo! 360, and Facebook do not leverage existing relationships that users have already established using their respective instant messaging clients. Social networks often require users to import, mass add, specify permissions, and wait for approval from each friend. Thus, the process for a user to get started in a social network is relatively long and cumbersome even though the user may already be associated with a messenger list (outside of the social network) that is rich with contact information.

Relationships on a social network are public, while relationships that are established using an instant messaging client are private. An instant messaging client does not automatically expose those private relationships. Furthermore, an instant messaging client should not automatically expose those private relationships because some contacts of a particular user may wish to remain unknown to most, if not all, users other than the particular user.

Based on the foregoing, there is a need to create a social network that leverages existing private relationships (e.g., in an instant messaging client) without the overhead of massive permissioning, i.e., allowing certain users certain rights to see content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. For example, although embodiments of the invention are described in the instant messaging context, other contexts are also applicable, such as existing social networks. Furthermore, embodiments of the invention are not limited to any particular platform. For example, the network may be a mobile phone network where each mobile phone of a user includes a contact list. In other instances, well-known structures and devices are shown in block diagram form in order to avoid unnecessarily obscuring the present invention.

General Overview

Techniques for creating and maintaining a social network are provided. Private relationships that are established (e.g., in the context of instant messaging) may become public by the action of a single user. For example, user A is a "friend" of user B and user B is a friend of user C, but user A and user C are not friends of each other (i.e., user A has not established a relationship with user C). If user C unilaterally takes an action, then user A is able to see that user C is a friend of user B. User A may then take further actions to attempt to establish a first-hand relationship with user C or otherwise communicate with user C.

Becoming Social

A user is "social" if the user is viewable by a friend of a friend of the user. For example, user A is a friend of user B and user B is a friend of user C, but user A is not a friend of user C. If user C is social, then user A is able to see user C as a friend of user B. In other words, user A can see that user B and user C have established a relationship even though user A and user C have not established a relationship.

In an embodiment, a first user "sees" a second user (e.g., in an instant messaging application) if the first user is able to view contact information of the second user. Contact information may include, but is not limited to, an instant messaging identifier that is used to contact the corresponding user, an email address of the user, a phone number of the user, a webpage of the user, or any combination thereof.

In an embodiment, given the situation above where user A is a friend of user B, user B is a friend of user C, and user C is social, the contact information of user C is sent to user A. Alternatively, if user C is not social, then the contact information of user C is not automatically sent to user A.

In an embodiment, a user takes one or more actions to become "social" without requiring any actions from other users. For example, an action to become social may be signing in to an instant messaging client (or a social networking website, such as MySpace) that includes the user's contact list. When a user is signed in to an instant messaging client or a social networking website, the user is said to be "online." Alternatively, the action may be selecting a "social" button or option in an instant messaging client or a social networking webpage of the user. The one or more actions represent a voluntary permission for other people in the network of users to see relationships that others have with that user. The one or more actions make the user's relationships with other users visible to the network.

In a related embodiment, if a user has selected a "social" button or option, then the user is always social, regardless of whether the user is currently online. Alternatively, in another embodiment, a user is only social after the user has selected the "social" button or option and is also currently online.

In a different embodiment, a user is by default social and must take one or more actions to become "unsocial." For example, the action may be selecting an "unsocial" button or option in an instant messaging client.

Establishing a Relationship

As used hereinafter, a "friend" or "contact" of a particular user is a user that has established a relationship with the particular user. The terms "friend" and "contact" are used interchangeably and carry the same meaning. Relationships may be established in multiple ways. Typically, establishing a relationship between two users requires each user to perform one or more actions on separate machines. For example, user A determines a user identifier for user B. User A uses an instant messaging client to send a request to user B. The request seeks permission from user B for user A to add user B to user A's contact list that is managed by the instant messaging client. User B either accepts or declines the request. If user B accepts the request, then user B is added to user A's contact list and, optionally, user A is added to user B's contact list. In the mobile phone context, a relationship is established when user A has user B as a contact in user A's contact list (and, optionally, vice versa).

EXAMPLES

Figure 1A:
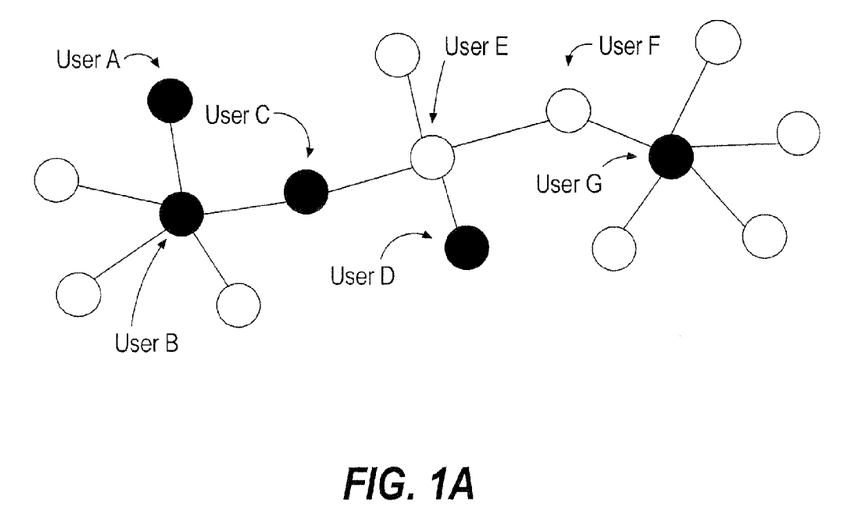
FIGS. 1A-B are diagrams that illustrate how one user becoming "social" affects the ability of other users to view more users, according to an embodiment of the invention.
Figure 1B:
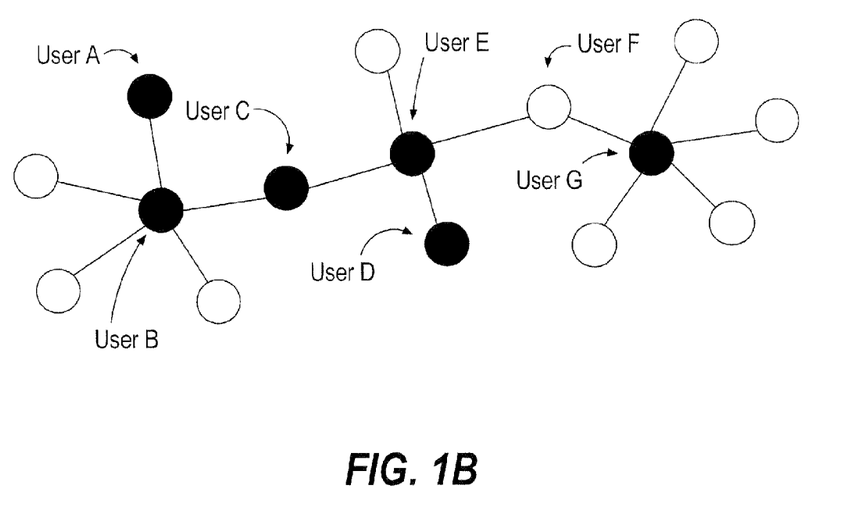

FIGS. 1A-B are diagrams that illustrate how one user becoming social affects the ability of other users to view more users, according to an embodiment of the invention. FIG. 1A illustrates that many relationships have been established. Each circle represents a user. Each line that connects two circles represents a relationship that has been established between the corresponding users. Each filled-in circle represents a user that is social (i.e., the user has taken one or more steps to become social). Each circle that is not filled in represents a user that is unsocial.

As user hereinafter, a "degree of separation" refers to how closely related a user is to another user. For example, users that are "friends" are one degree of separation away with respect to each other. Therefore, based on FIGS. 1A-B, user B is one degree of separation away from user A. User C is two degrees of separation away from user A. Therefore, each link or relationship represents one degree of separation. For example, if two users are separated by five links, then the two users are five degrees of separation away from each other.

In some network configurations, there may be multiple paths between two users. A "path" is a set of intermediate users and relationships that connect two users. In the context of FIGS. 1A-B, a path is set of circles and links that connect two circles. For example, there may be two different set of links that connect two users. Depending on the different paths (i.e., which intermediate users are social), one of the users may not be able to see the other user through one of the paths but may be able to see the other user through a different path.

In a first embodiment, a particular social user is able to see (in addition to those with whom the particular user has established a relationship) all other social users that (a) are two or more degrees of separation away from the particular user and (b) are connected to the particular social user through only social users. (References to a "first" and "second" embodiment are used to assist in understanding the difference between only two particular embodiments of the invention. Such references do not indicate that one embodiment is more important than the other, nor that the invention is limited to these two embodiments.) For example, user A is able to see user C because users B and C are both social. However, user A cannot see user D, even though user D is social, because there is not a social connection between users A and D (due to user E being unsocial).

In a second embodiment, even though a particular user is not social, a friend of the particular user is able to see any social friends of the particular user. For example, user C can see that user E and user D are friends even though user E is not social. Also, not only can user D see user C, but user D can also see users B and A. Furthermore, user E can see user G (through user F), and user F can see users A, B, C, and D (through user E).

FIG. 1B illustrates what effect a single user may have in a network of users when that user becomes social. In FIG. 1B, user E becomes social.

As is described above with reference to the first embodiment, a particular social user is able to see all other social users that are two or more degrees of separation away from the particular user and are connected to the particular social user through only social users. As a result of user E becoming social, not only can users A and B now see user E, but all of user B's friends (including users A and C) can see user D. Also, the unsocial friends of user E (including user F) are now able to see users A, B, C, and D.

As is described above with reference to the second embodiment, a friend of a particular user is able to see the particular user and any social friends of the particular user even though the particular user is not social. As a result of user E becoming social, user G is now able to see users A, B, C, D, and E.

Example User Interfaces

Figure 2A:
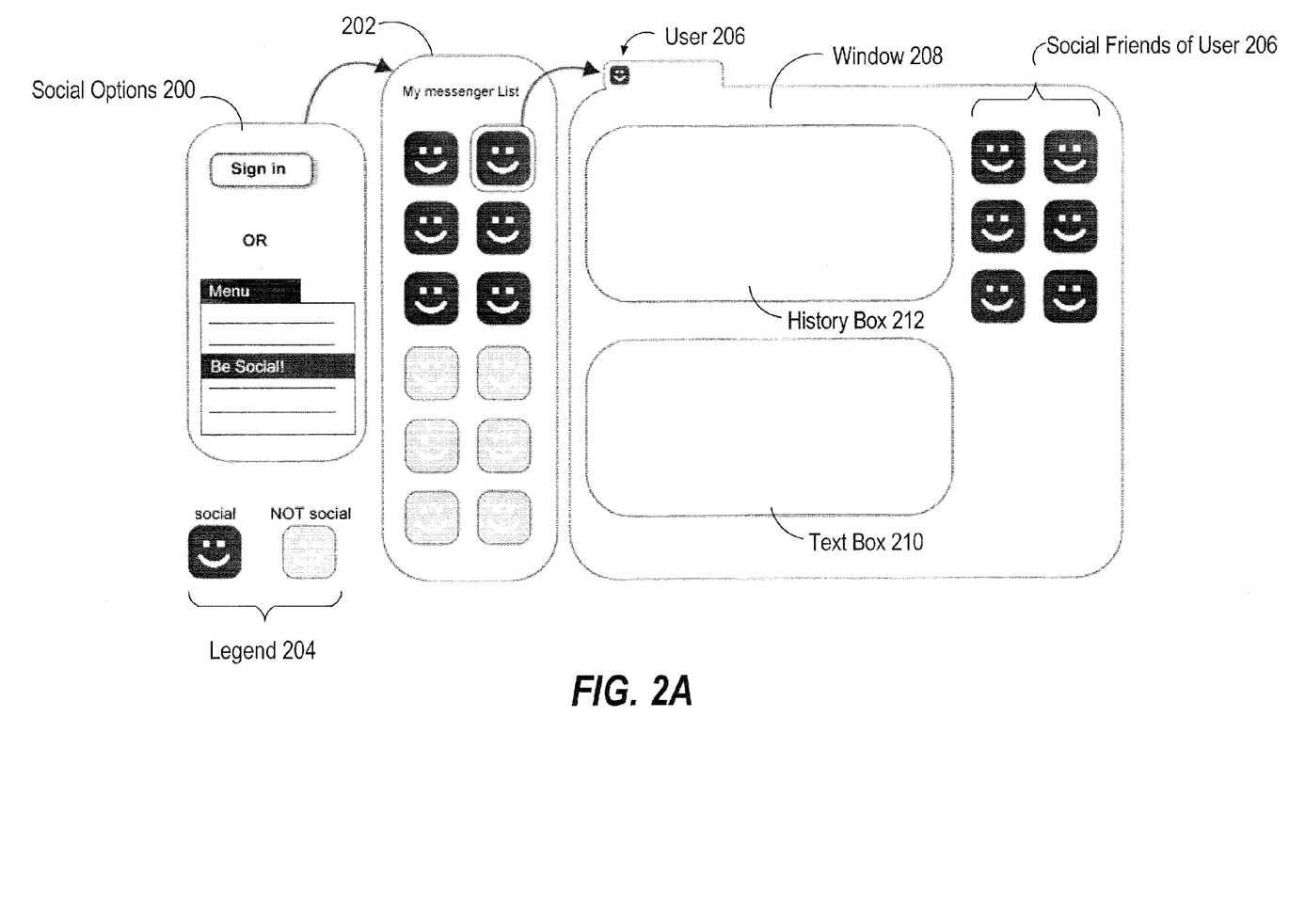
FIGS. 2A-C are diagrams that illustrate example user interfaces that show how "social" or non-social friends of a particular user appear to other friends of the particular user, according to embodiments of the invention.
Figure 2B:
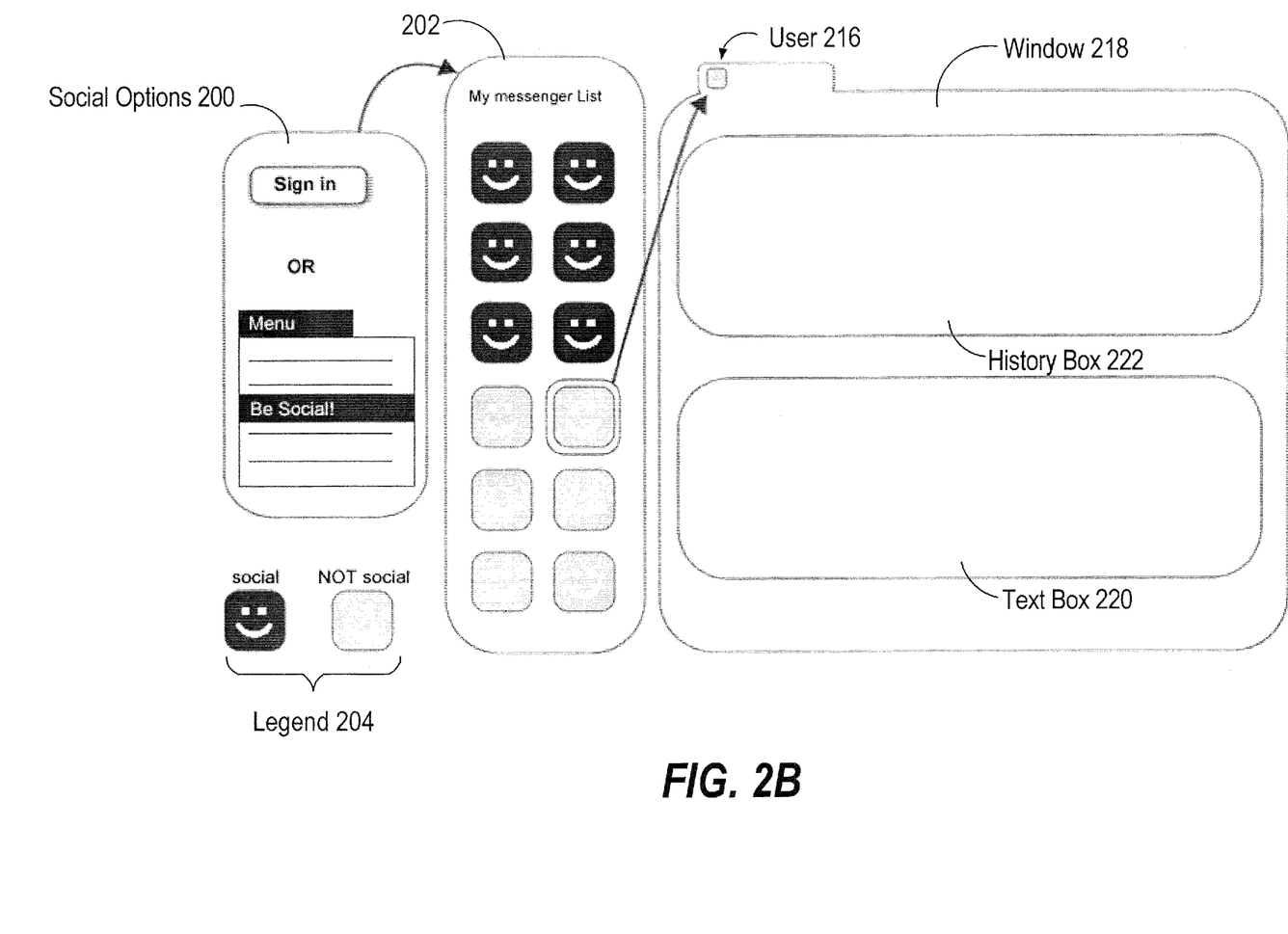
Figure 2C:
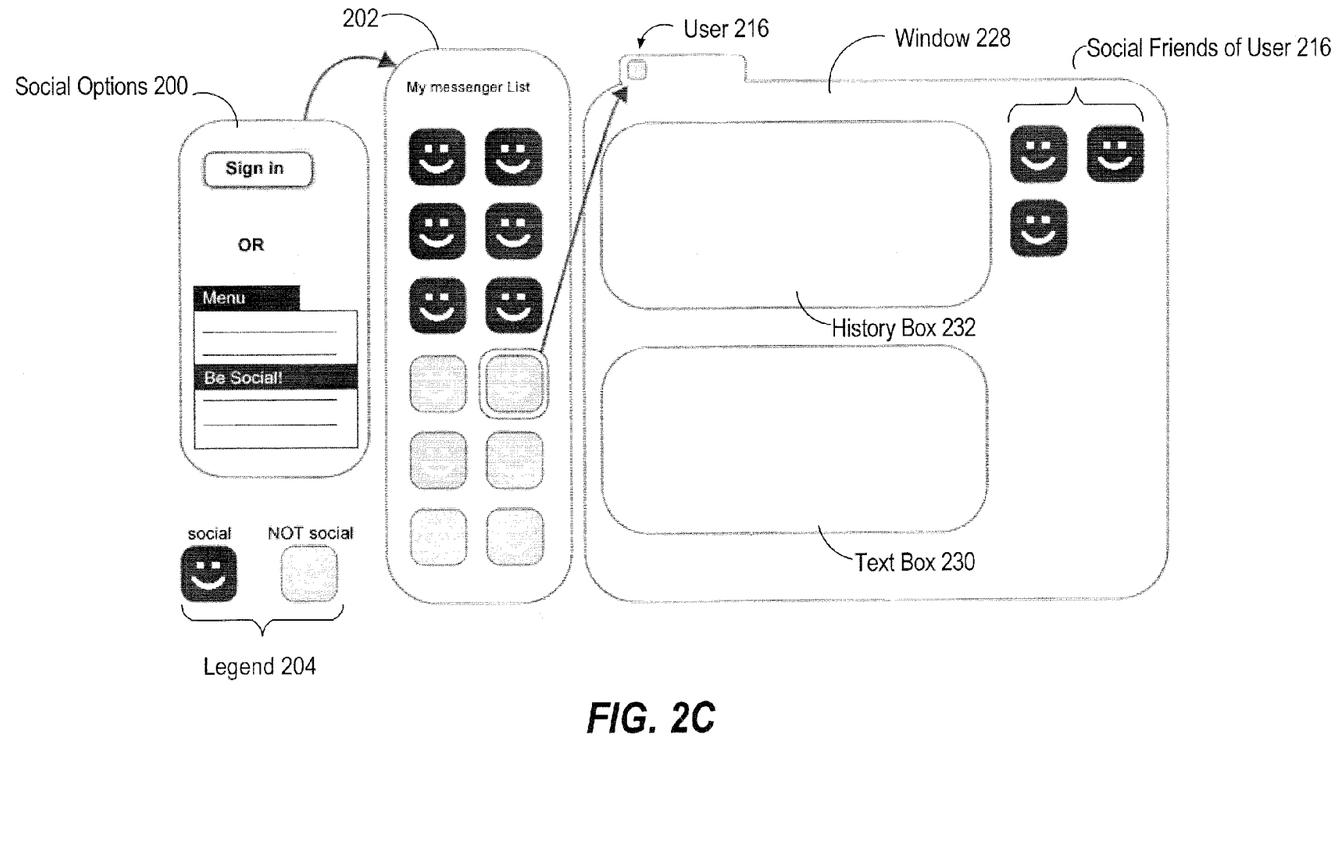

FIGS. 2A-C are diagrams that illustrate example user interfaces that show how social or unsocial friends of a particular user appear to other friends of the particular user, according to an embodiment of the invention. FIGS. 2A-C each comprise social options 200, a messenger list 202, and an optional legend 204. Social options 200 illustrate at least two possible ways to become social—either through signing in or through selecting a menu option. Messenger list 202 includes all (or a subset) of the contacts of the user of message list 202. The contacts in messenger list 202 may be divided into categories of the user's choosing, such as "Family", "Friends", "Work", etc. Legend 206 illustrates how a social contact appears in messenger list 202 and how an unsocial contact appears in messenger list 202. The user of messenger list 202 is referred to hereinafter, for the purposes of FIGS. 2A-C, as the "primary user."

FIG. 2A illustrates the primary user's selection of an icon (that represents a user 206) in messenger list 202. According to legend 204, user 206 is a social friend. As a result of the selection, a window 208 is generated. Window 208 includes a text box 210 for sending text messages to user 206, and a history box 212 that shows previous messages between the primary user and user 206. Window 208 may also provide options to send, to user 206, data that is not simple text, such as audio and video files.

Window 208 also includes icons that represent the social friends of user 206. Only social friends of user 206 are listed (i.e., represented by one or more icons). Thus, user 206 may have many unsocial friends that are not listed. Therefore, the primary user is able to see the social friends of user 206 but not the unsocial friends of user 206.

If the primary user selects an icon that represents one of the social friends of user 206, then a new window may be displayed that is similar to window 208 except that any social friends of the selected user are listed instead of the social friends of user 206. The primary user is then able to initiate a communication with that selected user, such as a request to establish a relationship followed by any instant communication, such as text, audio, or video.

FIG. 2B illustrates the selection of a different icon (that represents a user 216) in messenger list 202. According to legend 204, user 216 is an unsocial friend. In response to selecting the different icon, a window 218 is displayed that is similar to window 208 except that no friends or contacts of user 216 are displayed. If user 216 did have social contacts when the icon representing user 216 was selected, then FIG. 2B illustrates the first embodiment described above, which requires that a particular user be social in order for a friend of the particular user to see social friends of the particular user.

FIG. 2C also illustrates the selection of the icon, that represents user 216, in messenger list 202, except according to the second embodiment described above. In response to selecting the icon, a window 228 is displayed that is similar to window 218 except that social friends of user 216 are displayed. Similar to the situation in FIG. 2A, only social friends of user 216 are listed. Any unsocial friends of user 216 are not listed.

Expanded Social Network

Based on the foregoing, by the action of a single user, a particular user may be able to see many other users that the particular user was not able to previously see without the action of that single user. In an embodiment, the particular user is only able to see social friends of a friend that are currently signed in (i.e., online).

In a related embodiment, the particular user is able to see all social friends of a friend, regardless of whether those social friends are online. In this embodiment, mechanisms may be used to distinguish contacts that are currently online and those that are currently offline. For example, in Yahoo! Messenger™, an online contact is associated with a yellow "smiley" face, whereas an offline contact is associated with a gray "sleeping" face.

Per-Contact Settings

According to an embodiment of the invention, a user sets one or more viewability settings associated with individual contacts of the user. For example, a user may want to appear social to family members of the user and to contacts of the family members, but not to the user's psychiatrist and contacts of the user's psychiatrist. Therefore, the user sets a value, of an attribute or variable associated with the user's psychiatrist, that indicates that the user is unsocial with respect to the user's psychiatrist. As a result, other contacts of the user are unable to see that the psychiatrist is a contact of the user. Furthermore, contacts of the psychiatrist are unable to see the user as a contact of the psychiatrist.

In a related embodiment, the user is by default unsocial with respect to each contact except for those contacts for which the user sets a value, of an attribute or variable associated with the respective contacts, that indicates that the user is social with respect to those contacts.

Updating an Exisiting Private Network of Instant Messaging Clients

According to an embodiment of the invention, a set of instant messaging clients are updated based on an update package that includes executable code. Executing the executable code updates the corresponding instant messaging client. Alternatively, the user may download new software that includes a new instant messaging client, but which uses the contact list of a previous version of the instant messaging client. The new instant messaging client is said to be an updated instant messaging client.

The updated instant messaging client provides the ability for the user of the updated instant messaging client to be social (as described above) and, optionally, to modify the user's viewability with respect to individual contacts.

Example Benefits

According to various embodiments described herein, a user can potentially control his/her privacy settings to limit who can discover the user. One user action may expose all of the user's contacts that have also taken an action to be social (i.e., indicating that they do not mind being discovered).

Beneficially, the foregoing embodiments may create a social network built off of an existing instant messaging contact list very quickly without requiring permissioning. Currently, there are hundreds of millions of users of instant messaging clients. Such a network of users is inherently private. Using techniques described herein, the contact information of each of those users may be leveraged to create a vast network that is public, at least with respect to those users who want to be discoverable to other users (by becoming social) who are more than one degree of separation away. In contrast, as explained above, current social networks require a user to add, to those social networks, the contacts (in the instant messaging client) of the user all over again or to perform some import operation.

Furthermore, current social networks do not emphasize showing lists of online users. Thus, the interactions are limited to asynchronous modes of communication like email or comments. In other words, such networks emphasize public relationships, not presence.

In contrast, a real time social network as disclosed herein encourages real time interaction. When a user looks at friends in a real-time social network, the user knows that if s/he sends another user an instant message saying "hello," the other user will receive the instant message and both users are able to have a real-time chat (using text, audio, and/or video). Real time interactions are not limited to chat but may include collaborative activities such as whiteboarding or even multi-player games.

Hardware Overview

Figure 3:
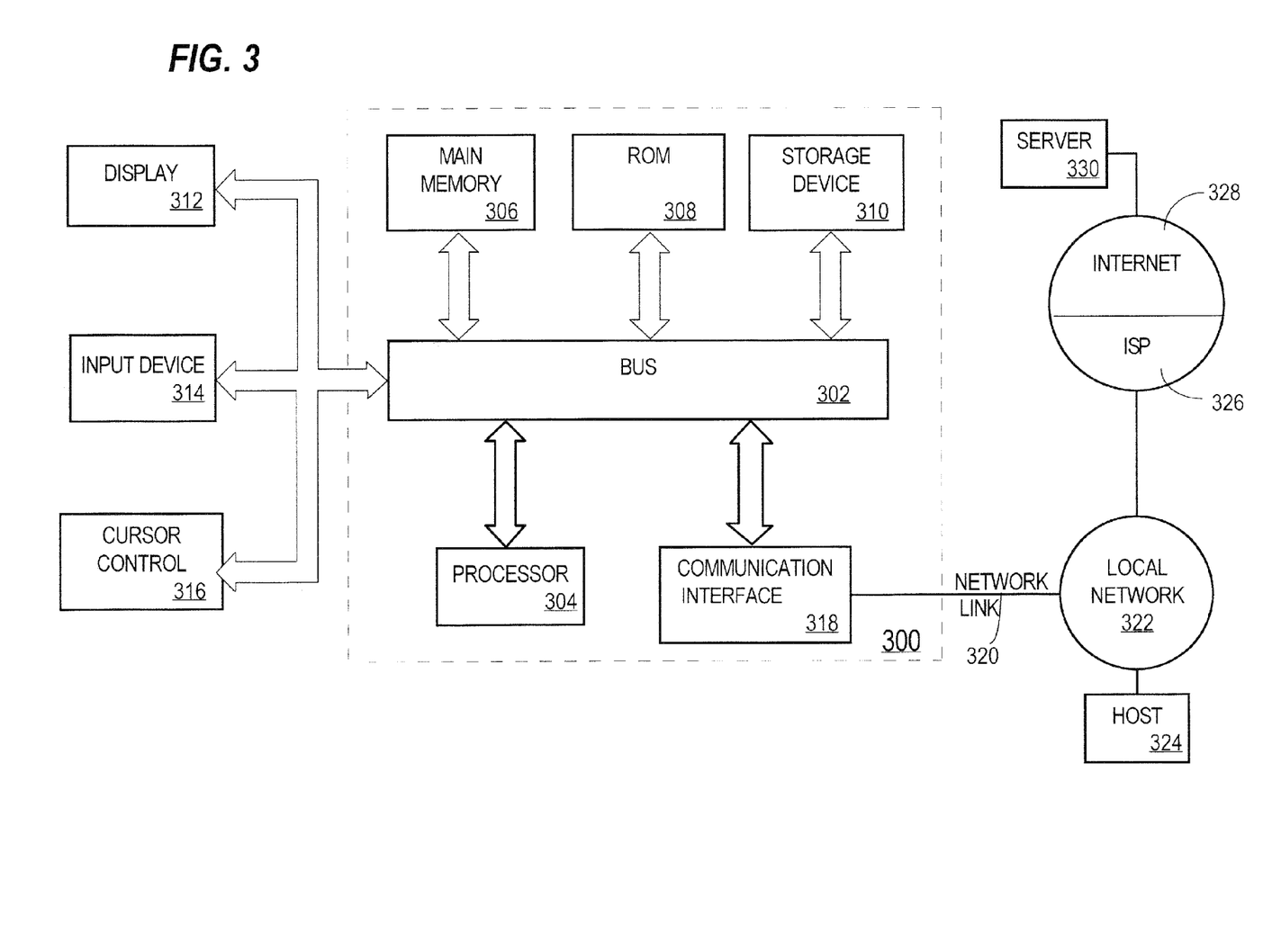
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    establishing, through a networking service, a plurality of relationships between a second user and a plurality of users that includes a first user that has not established, through the networking service, a relationship with any of the other users in the plurality of users;
    determining which users of the plurality of users have an online status and which users of the plurality of users have an offline status;

determining that a first subset of users of the plurality of users have an online status and that a second subset of users of the plurality of users have an offline status;

in response to determining that the first subset of users have an online status, making each user in the first subset of users of the plurality of users viewable by the first user through the networking service;

in response to determining that the second subset of users have an offline status, not allowing the first user to view any user in the second subset of users wherein the method is performed by one or more computing devices.

2. The method of claim 1, wherein establishing a relationship between the second user and a user of the plurality of users requires each of the two users establishing the relationship to perform one or more actions on separate computing devices.

3. The method of claim 1, wherein:
a third user of the plurality of users performs a first action; and
in response to the first action, making the relationship between the second user and the third user unviewable by the first user through the networking service.

4. The method of claim 1, wherein an instant messaging client of the first user sends, to an instant messaging client of a third user of the plurality of users, a request to establish a relationship with the third user.

5. The method of claim 1, wherein after making each user in the first subset of users of the plurality of users viewable by the first user through the networking service, an instant messaging client of the first user sends an real-time communication to an instant messaging client of a third user of the plurality of users.

6. The method of claim 1, further comprising:
receiving, at a particular instant messaging client of the second user, an update package that includes executable code;
executing the executable code to modify a particular instant messaging client of the second user;
wherein, as a result of executing the executable code, the first user is allowed to view the first subset of users.

7. One or more non-transitory computer-readable media storing instructions which, when executed by one or more processors, cause:
establishing, through a networking service, a plurality of relationships between a second user and a plurality of users that includes a first user that has not established, through the networking service, a relationship with any of the other users in the plurality of users;
determining which users of the plurality of users have an online status and which users of the plurality of users have an offline status;
determining that a first subset of users of the plurality of users have an online status and that a second subset of users of the plurality of users have an offline status;
in response to determining that the first subset of users have an online status, making each user in the first subset of users of the plurality of users viewable by the first user through the networking service;
in response to determining that the second subset of users have an offline status, not allowing the first user to view any user in the second subset of users.

8. The one or more non-transitory computer-readable media of claim 7, wherein establishing a relationship between the second user and a user of the plurality of users requires each of the two users establishing the relationship to perform one or more actions on separate computing devices.

9. The one or more non-transitory computer-readable media of claim 7, wherein:
a third user of the plurality of users performs a first action; and
in response to the first action, making the relationship between the second user and the third user unviewable by the first user through the networking service.

10. The one or more non-transitory computer-readable media of claim 7, wherein an instant messaging client of the first user sends, to an instant messaging client of a third user of the plurality of users, a request to establish a relationship with the third user.

11. The one or more non-transitory computer-readable media of claim 7, wherein after making each user in the first subset of users of the plurality of users viewable by the first user through the networking service, an instant messaging client of the first user sends an real-time communication to an instant messaging client of a third user of the plurality of users.

12. The one or more non-transitory computer-readable media of claim 7, wherein the instructions, when executed by one or more processors, further cause: receiving, at a particular instant messaging client of the second user, an update package that includes executable code;
executing the executable code to modify a particular instant messaging client of the second user;
wherein, as a result of executing the executable code, the first user is allowed to view the first subset of users.

13. A method comprising:
establishing, through a networking service, a plurality of relationships between a second user and a plurality of users that includes a first user that has not established, through the networking service, a first relationship with any of the other users in the plurality of users, wherein the first user is unable to view any of the other users in the plurality of users through the networking service;
in response to determining that the second user has performed a single action from a set of specified actions associated with the network service:
determining which users of the plurality of users have an online status and which users of the plurality of users have an offline status;
determining that a first subset of users of the plurality of users have an online status and that a second subset of users of the plurality of users have an offline status;
making each user in the first subset of users viewable by the first user while (a) not allowing the first user to view any user in the second subset of users or (b) allowing the first user to view the second subset of users and status data that indicates that each user in the second subset has an offline status.

14. The method of claim 13, wherein the set of specified actions includes signing in to an instant messaging client, selecting a menu option, and selecting a button.

15. The method of claim 13, wherein:
the first user is unable to view one or more relationships of the plurality of relationships through an instant messaging client of the first user without one or more users of the plurality of users performing any action from the set of specified actions associated with the networking service; and
the method further comprising making the one or more relationships viewable by the first user through the instant messaging client of the first user in response to the second user and the one or more users performing an action from the set of specified actions.

16. The method of claim 13, further comprising:
  establishing, through the networking service, a second relationship between the second user and a third user that is not the first user or the second user;
  setting, by a particular instant messaging client of the second user, a value for an attribute that is associated with the third user, wherein the third user has performed an action of the set of one or more specified actions; and
  in response to setting the value, preventing the second relationship from being viewable by the first user through an instant messaging client of the first user even though the third user has performed the action.

17. The method of claim 13, further comprising:
  establishing, through the networking service, a second relationship between the second user and a third user that is not the first user or the second user, wherein the third user has performed an action of the set of one or more specified actions, wherein the third user caused a value to be set for an attribute that is associated with the second user; and
  in response to the third user causing the value to be set, preventing the second relationship from being viewable by the first user through an instant messaging client of the first user even though the third user has performed the action.

18. The method of claim 13, wherein:
  the second user is associated with a list of contacts that is maintained by a particular instant messaging client of the second user and that includes contact information of each of the plurality of users;
  in response to the second user performing said action, setting an attribute that indicates that contact information of the second user is able to be viewed by contacts in a contact list that is maintained by a particular instant messaging client of the first user, wherein the contact list that is maintained by the particular instant messaging client of the first user includes contact information of a third user, wherein each user in the plurality of users is not in a contact list that is maintained by an instant messaging client of the third user; and
  in response to a particular action performed by the third user of the plurality of users, sending contact information of the second user from the particular instant messaging application of the first user to the instant messaging client of the third user.

19. The method of claim 18, wherein the particular action is the third user selecting, in the contact list that is maintained by the instant messaging client of the third user, an icon that represents the second user.

20. The method of claim 13, further comprising:
  in response to the second user performing a second single action associated with a particular instant messaging client of the second user, making each of the plurality of relationships unviewable by the first user through the networking service.

21. The method of claim 13, wherein:
  making each user in the first subset of users viewable by the first user comprises making each user in the first subset of users viewable by the first user through the networking service while allowing the first user to view the second subset of users and status data that indicates that each user in the second subset has an offline status.

22. One or more non-transitory computer-readable media storing instructions which, when executed by one or more processors, cause:
  establishing, through a networking service, a plurality of relationships between a second user and a plurality of users that includes a first user that has not established, through the networking service, a first relationship with any of the other users in the plurality of users, wherein the first user is unable to view any of the other users in the plurality of users through the networking service;
  in response to determining that the second user has performed a single action from a set of specified actions associated with the network service:
    determining which users of the plurality of users have an online status and which users of the plurality of users have an offline status;
    determining that a first subset of users of the plurality of users have an online status and that a second subset of users of the plurality of users have an offline status;
    making each user in the first subset of users viewable by the first user while (a) not allowing the first user to view any user in the second subset of users or (b) allowing the first user to view the second subset of users and status data that indicates that each user in the second subset has an offline status.

23. The one or more non-transitory computer-readable media of claim 22, wherein the set of specified actions includes signing in to an instant messaging client, selecting a menu option, and selecting a button.

24. The one or more non-transitory computer-readable media of claim 22, wherein:
  the first user is unable to view one or more relationships of the plurality of relationships through an instant messaging client of the first user without one or more users of the plurality of users performing any action from the set of specified actions associated with the networking service; and
  additional instructions which, when executed by the one or more processors, further cause making the one or more relationships viewable by the first user through the instant messaging client of the first user in response to the second user and the one or more users performing an action from the set of specified actions.

25. The one or more non-transitory computer-readable media of claim 22, wherein the instructions, when executed by one or more processors, further cause:
  establishing, through the networking service, a second relationship between the second user and a third user that is not the first user or the second user;
  setting by a particular instant messaging client of the second user, a value for an attribute that is associated with the third user, wherein the third user has performed an action of the set of one or more specified actions; and
  in response to setting the value, preventing the second relationship from being viewable by the first user through an instant messaging client of the first user even though the third user has performed the action.

26. The one or more non-transitory computer-readable media of claim 22, wherein the instructions, when executed by one or more processors, further cause:
  establishing, through the networking service, a second relationship between the second user and a third user that is not the first user or the second user, wherein the third user has performed an action of the set of one or more specified actions, wherein the third user caused a value to be set for an attribute that is associated with the second user; and
  in response to the third user causing the value to be set, preventing the second relationship from being viewable by the first user through an instant messaging client of the first user even though the third user has performed the action.

27. The one or more non-transitory computer-readable media of claim 22, wherein the instructions, when executed by one or more processors, further cause:
- the second user is associated with a list of contacts that is maintained by a particular instant messaging client of the second user and that includes contact information of each of the plurality of users;
- in response to the second user performing said action, setting an attribute that indicates that contact information of the second user is able to be viewed by contacts in a contact list that is maintained by a particular instant messaging client of the first user, wherein the contact list that is maintained by the particular instant messaging client of the first user includes contact information of a third user, wherein each user in the plurality of users is not in a contact list that is maintained by an instant messaging client of the third user; and
- in response to a particular action performed by the third user of the plurality of users, sending contact information of the second user from the particular instant messaging application of the first user to the instant messaging client of the third user.

28. The one or more non-transitory computer-readable media of claim 27, wherein the particular action is the third user selecting, in the contact list that is maintained by the instant messaging client of the third user, an icon that represents the second user.

29. The one or more non-transitory computer-readable media of claim 22, wherein the instructions, when executed by one or more processors, further cause:
- in response to the second user performing a second single action associated with a particular instant messaging client of the second user, making each of the plurality of relationships unviewable by the first user through the networking service.

30. The one or more non-transitory computer-readable media of claim 22, wherein making each user in the first subset of users viewable by the first user comprises making each user in the first subset of users viewable by the first user through the networking service while allowing the first user to view the second subset of users and status data that indicates that each user in the second subset has an offline status.

* * * * *